United States Patent
Zhang et al.

(10) Patent No.: US 12,024,609 B2
(45) Date of Patent: Jul. 2, 2024

(54) BENZOXAZINE BASED POLYURETHANE RESIN COMPOSITION

(71) Applicant: Huntsman International LLC, The Woodlands, TX (US)

(72) Inventors: Yuefan Zhang, Shanghai (CN); Fan Xie, Shanghai (CN)

(73) Assignee: Huntsman International LLC, The Woodlands, TX (US)

( * ) Notice: Subject to any disclaimer, the term of this patent is extended or adjusted under 35 U.S.C. 154(b) by 387 days.

(21) Appl. No.: 17/290,844

(22) PCT Filed: Nov. 9, 2018

(86) PCT No.: PCT/CN2018/114686
§ 371 (c)(1),
(2) Date: May 3, 2021

(87) PCT Pub. No.: WO2020/093346
PCT Pub. Date: May 14, 2020

(65) Prior Publication Data
US 2021/0388168 A1    Dec. 16, 2021

(51) Int. Cl.
| | | |
|---|---|---|
| *C08J 9/12* | (2006.01) |
| *C08G 18/16* | (2006.01) |
| *C08G 18/18* | (2006.01) |
| *C08G 18/22* | (2006.01) |
| *C08G 18/32* | (2006.01) |
| *C08G 18/34* | (2006.01) |
| *C08G 18/48* | (2006.01) |
| *C08G 18/76* | (2006.01) |
| *C08K 5/357* | (2006.01) |

(52) U.S. Cl.
CPC ............ *C08J 9/125* (2013.01); *C08G 18/163* (2013.01); *C08G 18/1833* (2013.01); *C08G 18/225* (2013.01); *C08G 18/3228* (2013.01); *C08G 18/341* (2013.01); *C08G 18/4829* (2013.01); *C08G 18/7671* (2013.01); *C08K 5/357* (2013.01); *C08G 2110/0025* (2021.01); *C08G 2110/0083* (2021.01); *C08J 2203/10* (2013.01); *C08J 2205/10* (2013.01); *C08J 2375/12* (2013.01)

(58) Field of Classification Search
CPC .............. C08G 18/163; C08G 18/1833; C08G 18/225; C08G 18/3228; C08G 18/341; C08G 18/4211; C08G 18/4829; C08G 18/5024; C08G 18/7664; C08G 18/7671; C08G 2110/0025; C08G 2110/0083; C08J 9/125; C08J 2203/10; C08J 2205/10; C08J 2375/12; C08K 5/357; C08L 61/34
See application file for complete search history.

(56) References Cited

FOREIGN PATENT DOCUMENTS

| | | | |
|---|---|---|---|
| CN | 1763119 A | 4/2006 | |
| CN | 102838718 | 12/2012 | |
| CN | 103254451 | 8/2013 | |
| CN | 108102072 A | 6/2018 | |
| EP | 1205502 A1 | 5/2002 | |
| WO | WO-2010031826 A1 * | 3/2010 | ................ C08J 5/24 |

OTHER PUBLICATIONS

Takeichi, Tsutomu, et al. "Synthesis and Characterization of Poly-(urethane-benzoxazine) Films as Novel Type of Polyurethane/Phenolic Resin Composites" Journal of Polymer Science: Part A: Polymer Chemistry, vol. 38, Dec. 31, 2000, 4165-4176.
International Search Report received in corresponding PCT Application PCT/CN2018/114686 completed Jul. 15, 2019 and dated Jul. 26, 2019.
Written Opinion received in corresponding PCT Application PCT/CN2018/114686 completed Jul. 15, 2019 and dated Jul. 26, 2019.
Sarawut et al., Enhanced Film Forming Ability of Benzoxazine-Urethane Hybrid Polymer Network by Sequential Cure Method, Journal of Applied Polymer Science (2014).

* cited by examiner

*Primary Examiner* — John M Cooney
(74) *Attorney, Agent, or Firm* — Huntsman International; Lewis Craft

(57) ABSTRACT

This disclosure generally provides compositions with improved flammability resistance and processes for preparing these compositions, wherein the resin composition comprising: (a) a polyfunctional isocyanate; (b) an isocyanate reactive composition comprising (b1) a polyfunctional polyol and a catalyst composition; and/or (b2) a polyfunctional amine; and (c) a benzoxazine component solved in the resin composition.

13 Claims, No Drawings

BENZOXAZINE BASED POLYURETHANE RESIN COMPOSITION

CROSS-REFERENCE TO RELATED APPLICATIONS

This application is the National Phase of International Application PCT/CN2018/114686 filed Nov. 9, 2018. The noted applications are incorporated herein by reference.

FIELD OF THE INVENTION

This invention relates generally to benzoxazine based polyurethane resin compositions and more specially to benzoxazine based polyurethane resin compositions used in polyurethane foams.

BACKGROUND INFORMATION

Polyurethane (PU) and benzoxazine mixture are already known in the art.

CN103254451 discloses a benzoxazine and polyurethane blend resin. But polyurethane is used as additives to be added to benzonxazine resin system.

CN102838718 discloses the use of polyurethane to improve heat-resistant performance of benzoxazine resin.

Enhanced Film Forming Ability of Benzoxazine-Urethane Hybrid Polymer Network by Sequential Cure Method, R. Sarawut, et al, Journal of Applied Polymer Science (2014) discloses the use of benzoxazine-urethane hybrid polymer in coating or film casting process. The polyol used in such compositions is very special and with high molecular weight.

However, known solutions are not able to provide a PU resin composition with high glass transition temperature and improved flammability resistance.

SUMMARY OF THE INVENTION

It has now been surprisingly found that the compositions and processes of the present disclosure address the above problem. Advantages of the present disclosure may include: (1) high glass transition temperature (Tg); (2) improved flammability resistance; and (3) no obvious influence on the mechanic properties of the foam.

The present disclosure is concerned with compositions with improved flammability resistance and processes for preparing these compositions. In one embodiment, the disclosure provides a resin composition comprising: (a) a polyfunctional isocyanate; (b) an isocyanate reactive composition comprising (b1) a polyfunctional polyol and a catalyst composition; and/or (b2) a polyfunctional amine; and (c) a benzoxazine component solved in the resin composition; wherein the molecular weight of the polyfunctional polyol is in an amount ranging from about 100 to about 800, preferably from about 200 to about 700; the portion of benzoxazine component (c) by weight percentage of the amount of component (b) and (c) is in the range from about 25 to about 60, preferably from about 30 to about 50.

In another embodiment, the present disclosure provides a process for making the resin compositions.

In still another embodiment, the present disclosure provides a method of using the resin compositions to form a rigid foam product.

DETAILED DESCRIPTION

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical object of the article. By way of example, "a resin" means one resin or more than one resin.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The present disclosure generally provides a resin composition comprising: (a) a polyfunctional isocyanate; (b) an isocyanate reactive composition comprising (b1) a polyfunctional polyol and a catalyst composition; and/or (b2) a polyfunctional amine; and (c) a benzoxazine component solved in the resin composition; wherein the molecular weight of the polyfunctional polyol is in an amount ranging from about 100 to about 800, preferably from about 200 to about 700; the portion of benzoxazine component (c) by weight percentage of the amount of component (b) and (c) is in the range from about 25 to about 60, preferably from about 30 to about 50.

According to one embodiment, the polyfunctional isocyanate includes those represented by the formula $Q(NCO)_n$, where n is a number from 2-5, preferably 2-3 and Q is an aliphatic hydrocarbon group containing 2-18 carbon atoms, a cycloaliphatic hydrocarbon group containing 5-10 carbon atoms, an araliphatic hydrocarbon group containing 8-13 carbon atoms, or an aromatic hydrocarbon group containing 6-15 carbon atoms, wherein aromatic hydrocarbon groups are in general preferred.

Examples of polyfunctional isocyanates include, but are not limited to, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; isophorone diisocyanate; 2,4- and 2,6-hexahydrotoluene diisocyanate and mixtures of these isomers; dicyclohexylmethane-4,4'-diisocyanate (hydrogenated MDI or HMDI); 1,3- and 1,4-phenylene diisocyanate; 2,4- and 2,6-toluene diisocyanate and mixtures of these isomers (TDI); diphenylmethane-2,4'- and/or -4,4'-diisocyanate (MDI); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (polymeric MDI); norbornane diisocyanates; m- and p-isocyanatophenyl sulfonylisocyanates; perchlorinated aryl polyisocyanates; modified polyfunctional isocyanates containing carbodiimide groups, urethane groups, allophonate groups, isocyanurate groups, urea groups, or biruret groups; polyfunctional isocyanates obtained by telomerization reactions; polyfunctional isocyanates containing ester groups; and polyfunctional isocyanates containing polymeric fatty acid groups. Those skilled in the art will recognize that it is also possible to use mixtures of the polyfunctional isocyanates described above, preferably using mixture of polymeric MDI, mixture of MDI isomers and mixture of TDI. In another embodiment, prepolymers of MDI or TDI can also be used as an alternative of MDI or TDI. Prepolymers of MDI or TDI are prepared by the reaction of an excess of above mentioned polyfunctional isocyanates (such as an MDI or TDI) and a polyfunctional polyol. The prepolymer preferably has an NCO value of 20-35% by weight. The synthesis processes of prepolymers of MDI or TDI are known in the art (see for example Polyurethanes Handbook $2^{nd}$ edition, G. Oertel, 1994).

The isocyanate reactive composition suitable for use in the present disclosure may include polyfunctional polyol or polyfunctional amine.

The polyfunctional polyols for use in the present disclosure may include, but are not limited to, polyether polyols, polyester polyols, biorenewable polyols, polymer polyols, a non-flammable polyol such as a phosphorus-containing polyol or a halogen-containing polyol. Such polyols may be used alone or in suitable combination as a mixture.

General functionality of polyfunctional polyols used in the present disclosure is from 2 to 6. The molecular weight of polyols may be in an amount ranging from 100 to 800, preferably from 200 to 700.

Molecular weight (MW) is weight average molecular weight which is defined by Gel Permeation Chromatography (GPC) method with polystyrene as a reference.

The proportion of said polyfunctional polyols is generally in an amount ranging from 10% to 80% by weight, preferably from 15% to 40% based on the resin composition. Poly ether polyols for use in the present disclosure include alkylene oxide poly ether polyols such as ethylene oxide polyether polyols and propylene oxide polyether polyols and copolymers of ethylene and propylene oxide with terminal hydroxyl groups derived from polyhydric compounds, including diols and triols; for example, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, and similar low molecular weight polyols.

Polyester polyols for use in the present disclosure include, but are not limited to, those produced by reacting a dicarboxylic acid with an excess of a diol, for example, adipic acid with ethylene glycol or butanediol, or reaction of a lactone with an excess of a diol such as caprolactone with propylene glycol. In addition, polyester polyols for use in the present disclosure may also include: linear or lightly branched aliphatic (mainly adipates) polyols with terminal hydroxyl group; low molecular weight aromatic polyesters; polycaprolactones; polycarbonate polyol. Those linear or lightly branched aliphatic (mainly adipates) polyols with terminal hydroxyl group are produced by reacting a dicarboxyl acids with an excess of diols, triols and their mixture; those dicarboxyl acids include, but are not limited to, for example, adipic acid, AGS mixed acid; those diols, triols include, but are not limited to, for example, ethylene glycol, diethylene glycol, propylene glycol, dipropylene glycol, 1,4-butane diol, 1,6-hexane diol, glycerol, trimethylolpropane and pentaerythritol. Those low molecular weight aromatic polyesters include products derived from the process residues of dimethyl terephalate (DMT) production, commonly referred to as DMT still bottoms, products derived from the glycolysis of recycled poly(ethyleneterephthalate) (PET) bottles or magnetic tape with subsequent re-esterification with di-acids or reaction with alkylene oxides, and products derived by the directed esterification of phthalic anhydride. Polycaprolactones are produced by the ring opening of caprolactones in the presence of an initiator and catalyst. The initiator includes ethylene glycol, diethylene glycol, propylene glycol, dipropylene glycol, 1,4-butane diol, 1,6-hexane diol, glycerol, trimethylolpropane and pentaerythritol. Polycarbonate polyols are derived from carbonic acid—that can be produced through the polycondensation of diols with phosgene, although transesterification of diols, commonly hexane diol, with a carbonic acid ester, such as diphenylcarbonate.

Biorenewable polyols suitable for use in the present disclosure include castor oil, sunflower oil, palm kernel oil, palm oil, canola oil, rapeseed oil, soybean oil, corn oil, peanut oil, olive oil, algae oil, and mixtures thereof.

Examples of polyfunctional polyols also include, but are not limited to, graft polyols or polyurea modified polyols. Graft polyols comprise a triol in which vinyl monomers are graft copolymerized. Suitable vinyl monomers include, for example, styrene, or acrylonitrile. A polyurea modified polyol, is a polyol containing a polyurea dispersion formed by the reaction of a diamine and a diisocyanate in the presence of a polyol. A variant of polyurea modified polyols are polyisocyanate poly addition (PIPA) polyols, which are formed by the in situ reaction of an isocyanate and an alkanolamine in a polyol. The non-flammable polyol may, for example, be a phosphorus-containing polyol obtainable by adding an alkylene oxide to a phosphoric acid compound. A halogen-containing polyol may, for example, be those obtainable by ring-opening polymerization of epichlorohydrine or trichlorobutylene oxide.

The polyfunctional amine for use in the present disclosure may include polyether polyamine or polyester polyamine.

In a preferred embodiment, the isocyanate reactive composition is poly ether polyol, polyester polyol or a polyether amine.

It is found that adding compound (c) in the resin composition of the present disclosure can improve flammability resistance.

According to one embodiment, the benzoxazine component may be any monomer, oligomer or polymer containing at least one benzoxazine moiety.

In one embodiment, the benzoxazine may be bis(dihydrobenzoxazines) on the basis of bisphenols, which are commercially available and can be prepared according to well-known and published methods. Bis(dihydrobenzoxazines) on the basis of bisphenols may correspond to formula (I),

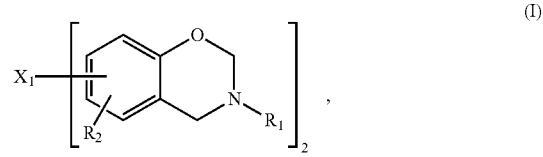

(I)

wherein
$R_1$ is $C_1$-$C_{18}$alkyl, or $C_3$-$C_{12}$cycloalkyl, $C_3$-$C_{12}$cycloalkyl-$C_1$-$C_4$alkyl, $C_6$-$C_{18}$aryl or $C_6$-$C_{18}$aryl-$C_1$-$C_4$alkyl, which are unsubstituted or substituted by one or more $C_1$-$C_6$alkyl groups or $C_1$-$C_6$alkoxy groups;

$R_2$ hydrogen, dialkylamino; alkylthio; alkylsulfonyl; $C_1$-$C_{18}$alkyl; $C_1$-$C_{18}$alkoxy; $C_1$-$C_{18}$alkoxyalkyl; $C_5$-$C_{12}$cycloalkyl that is unsubstituted or substituted by one or more $C_1$-$C_6$alkyl groups or $C_1$-$C_6$alkoxy groups; $C_6$-$C_{12}$aryl that is unsubstituted or substituted by one or more $C_1$-$C_6$alkyl groups or $C_1$-$C_6$alkoxy groups; or $C_7$-$C_{13}$aralkyl that is unsubstituted or substituted by one or more $C_1$-$C_6$alkyl groups or $C_1$-$C_6$alkoxy groups;

$X_1$ is a direct bond or a bivalent bridging group selected from —O—, —S—, —S(O)—, —S(O)$_2$—, —C(O)—, —NR$_3$—, —O—C(O)—, —O—C(O)—O—, —SO$_2$—O—, —O—SO$_2$—O—, —NR$_3$—C(O)—, —NR$_3$—C(O)—O—, —NR$_3$—C(O)—NR$_3$—, —NR$_3$SO$_2$—, —NR$_3$—SO$_2$—O—, —O—SO$_2$NR$_3$—, —NR$_3$SO$_2$—NR$_3$—, —P(O)(OR$_3$)O—, —OP(OR$_3$)O—, —(O)P(OR$_3$)—, —P(OR$_3$)—, —P(R$_3$)—, —O—(O)P(R$_3$)—O—, $C_1$-$C_{18}$alkylen, $C_2$-$C_{18}$alkyliden, $C_3$-$C_{12}$cycloalkylen or -cycloalkyliden, —Si(OR$_3$)$_2$— and —Si(R$_3$)$_2$—; and $R_3$ is H or $C_1$-$C_{12}$alkyl, $C_5$- or $C_6$-cycloalkyl, $C_5$- or $C_6$-cycloalkyl-methyl or -ethyl, phenyl, benzyl or 1-phenyleth-2-yl.

When the radicals $R_1$ to $R_3$ are alkyl, alkoxy or alkoxyalkyl, those alkoyl or alkoxy radicals can be straight-chained or branched and may contain 1 to 12, more preferably 1 to 8 and most preferably 1 to 4 C atoms.

Examples of alkyl groups are methyl, ethyl, isopropyl, n-propyl, n-butyl, isobutyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl and octadecyl groups.

Suitable alkoxy groups are, for example, methoxy, ethoxy, isopropoxy, n-propoxy, n-butoxy, isobutoxy, sec-butoxy, tert-butoxy and the various isomeric pentyloxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy and octadecyloxy groups.

Examples of alkoxyalkyl groups are 2-methoxyethyl, 2-ethoxyethyl, 2-methoxypropyl, 3-methoxypropyl, 4-methoxy butyl and 4-ethoxy butyl.

Cycloalkyl is preferably $C_5$-$C_8$cycloalkyl, especially $C_5$- or $C_6$-cycloalkyl. Some examples thereof are cyclopentyl, methylcyclopentyl, cyclohexyl, cycloheptyl and cyclooctyl.

Aryl groups are, for example, phenyl, naphthyl and anthryl.

Aralkyl preferably contains from 7 to 12 carbon atoms and especially from 7 to 11 carbon atoms. It may be, for example, benzyl, phenethyl, 3-phenylpropyl, α-methylbenzyl, 4-phenylbutyl or, α,α-dimethylbenzyl.

$R_1$ is preferably $C_1$-$C_{12}$alkyl, $C_5$-$C_8$cycloalkyl or $C_5$-$C_8$cycloalkyl-$C_1$-$C_2$alkyl that is unsubstituted or substituted by one or more $C_1$-$C_4$alkyl groups or $C_1$-$C_4$alkoxy groups, $C_6$-$C_{10}$aryl or $C_6$-$C_{10}$aryl-$C_1$-$C_2$alkyl that is unsubstituted or substituted by one or more $C_1$-$C_4$alkyl groups or $C_1$-$C_4$alkoxy groups.

In a more preferred embodiment of the present disclosure, $R_1$ is $C_1$-$C_6$alkyl, or phenyl or benzyl—both unsubstituted or substituted by one or more methyl groups or methoxy groups.

According to the present disclosure, compounds of formula (I) are preferred, in which $R_1$ is isopropyl, iso- or tertiary-butyl, n-pentyl or phenyl.

$R_2$ in the compounds of formula (I) is preferably hydrogen.

Cycloalkylen $X_1$ may be a polycycloalkylen having 2 to 4 condensed and/or bridged carbon cycles such as bicyclo-[2,2,1]-heptanylene or tricyclo-[2,1,0]-decanylene.

$X_1$ is preferably a direct bond or more preferably a bivalent bridging group selected from —O—, —S—, —S(O)—, —S(O)$_2$—, —C(O)—, —P(O)(OR$_3$)O—, —OP(OR$_3$)O—, —OP(OR$_3$)—, —P(OR$_3$)—, —P(R$_3$)—, $C_1$-$C_2$alkylen, and $C_1$-$C_{12}$alkyliden, wherein $R_3$ $C_1$-$C_4$alkyl, $C_5$- or $C_6$-cycloalkyl, phenyl or benzyl.

$R_3$ is preferably H, $C_1$-$C_{12}$alkyl, $C_5$- or $C_6$-cycloalkyl, $C_5$- or $C_6$-cycloalkyl-methyl or -ethyl, phenyl, benzyl or 1-phenyleth-2-yl. If $R_3$ is part of the groups P(O)(OR$_3$)O—, —OP(OR$_3$)O—, —OP(OR$_3$)—, —P(OR$_3$)— and —P(R$_3$), then it is preferably not hydrogen.

In a preferred embodiment, $R_3$ is selected from $C_1$-$C_4$alkyl, cyclohexyl, phenyl or benzyl. Some preferred examples of bisphenols used to prepare bis(dihydrobenzoxazines) are 4,4'-dihydroxybiphenyl, (4-hydroxyphenyl)$_2$C(O) (DHBP), bi(4-hydroxyphenyl)ether, bi(4-hydroxyphenyl)thioether, bisphenol A, bisphenol AP, bisphenol E, bisphenol H, bisphenol F, bisphenol S, bisphenol Z, phenolphthalein and bi(4-hydroxyphenyl)tricyclo-[2,1,0]-decan.

The portion of benzoxazine component (c) by weight percentage of the amount of component (b) and (c) is in the range from about 25 to about 60, preferably from about 30 to about 50.

In the present disclosure, the composition further includes one or more catalysts in order to catalyse the reaction between polyfunctional isocyanate and polyfunctional polyol or the isocyanate trimerisation reaction, for example, amine catalyst such as N,N-dimethylethanolamine, N,N-dimethyl-N',N'-di(2-hydroxypropyl)-1,3-propanediamine, 2-((2-(2-(dimethylamino)ethoxy)ethyl)methylamino)ethanol, dimethylcyclohexylamine and triethylene diamine, and trimerisation catalyst such as tertiary amines, triazines and most preferably metal salt trimerisation catalysts.

Examples of suitable metal salt trimerisation catalysts are alkali metal salts of organic carboxylic acids. Preferred alkali metals are potassium and sodium. And preferred carboxylic acids are acetic acid and 2-ethylhexanoic acid.

Preferred metal salt trimerisation catalysts are potassium acetate (commercially available as Catalyst LB from Huntsman Polyurethanes) and potassium 2-ethylhexanoate.

Two or more different catalysts can be used in the process of the present disclosure.

In one embodiment, the proportion of the catalysts present in the composition is in an amount ranging from 0.001 to 10 wt %, preferably from 0.1 to 5 wt % based on the total weight of the resin composition.

According to one embodiment, the NCO index of the resin composition is in the range of from 0.7 to 5, preferably from 1 to 5, and more preferably from 1.2 to 4.

The isocyanate index or NCO index or index is the ratio of NCO-groups over isocyanate-reactive hydrogen atoms present in a formulation.

[NCO]
[Active Hydrogen]

In other words the NCO-index expresses the amount of isocyanate actually used in a formulation with respect to the amount of isocyanate theoretically required for reacting with the amount of isocyanate-reactive hydrogen used in a formulation.

In another embodiment, the resin composition may further optionally comprise fire retardants, antioxidants, solvents, surfactants, physical or chemical blowing agents, chain extender, crosslinking agent, foam stabilizer, fillers, pigments, or any other typical additives used in PU materials.

Advantages of the disclosed composition may include: (1) high glass transition temperature; (2) improved flammability resistance; and (3) no obvious influence on the mechanic properties of the foam.

The present disclosure also provides a process for making the resin composition, comprising adding benzoxazine component and isocyanate reactive composition to a polyfunctional isocyanate.

The present disclosure also provides a process for making the resin composition, comprising adding benzoxazine component to a thermoplastic polyurethane (TPU). TPU of the present disclosure is generated from the reaction of a difunctional isocyanate, a difunctional polyol and a difunctional diol as chain extender.

Furthermore, the present disclosure also provides the method of using the resin compositions to form a rigid foam product, such as insulation layer in the roof, wall or refrigeration.

The examples which now follow should be considered exemplary of the present disclosure, and not delimitive thereof in any way.

Raw Materials

Polyfunctional Isocyanate: SUPRASEC® 5005 polymeric MDI (Supplier: Huntsman Corporation, USA);

Polyol A: STEPANPOL® PS-3152 difunctional polyester polyol; has a molecular weight around 356 (Supplier: Stepan Company, USA);

Polyol B: DALTOLAC® R 200 polyether polyol; has a molecular weight around 679 (Supplier: Huntsman Corporation, USA);

Polyetheramine: JEFF AMINE® T-403 trifunctional primary amine; has a molecular weight around 440 (Supplier: Huntsman Corporation, USA);

TPU: IROGRAN® A 85 P 4394 TPU material (Supplier: Huntsman Corporation, USA);

Foam Stabilizer: TEGOSTAB® B8462 polymer additive (silicone surfactant). (Supplier: Evonik);

Catalyst A: bis(N,N-dimethylaminoethyl)ether;

Catalyst B: a mixture of 48.2 wt % potassium acetate, 48.2 wt % ethylene glycol and 3.6 wt % $H_2O$;

Benzoxazine: CB3100 (bisphenol-A based benzoxazine). (Supplier: Chengdu Coryes Polymer Science& Technology Company);

Solvent: triethylphosphate

Examples 1-13

Examples 1-11 were produced with the Polyfunctional Isocyanate as the A Component. The B Components for Examples 1 through 11 are shown in Table 1. All values listed in Table 1 refer to parts by weight of the B Component. As shown in Table 1, Examples 9 to 11 were comparative examples that contained no benzoxazine.

TABLE 1

| B Component Formulation | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Polyol A | 93 | 93 | 93 | 93 | 93 | 93 | | | 93 | 93 | |
| Polyol B | | | | | | | 93 | | | 93 | |
| Polyetheramine | | | | | | | | 100 | | | 100 |
| Foam Stabilizer | 2 | 2 | 2 | 2 | 2 | 2 | 2 | | 2 | 2 | |
| Catalyst A | 0.2 | 0.2 | 0.2 | 0.2 | 0.2 | 0.2 | 0.2 | | 0.2 | 0.2 | |
| Catalyst B | 1.8 | 1.8 | 1.8 | 1.8 | 1.8 | 1.8 | 1.8 | | 1.8 | 1.8 | |
| Benzoxazine | 20 | 40 | 60 | 80 | 60 | 60 | 26 | 40 | | | |
| Solvent | 10 | 20 | 30 | 40 | 30 | 30 | 13 | 20 | | | |
| water | 3 | 3 | 3 | 3 | 3 | 3 | 3 | | 3 | 3 | |

Example 12 was produced with 100 parts by weight of TPU and 40 parts by weight of Benzoxazine. Examples 13 was comparative example that contained 100 parts by weight of TPU without Benzoxazine.

Procedure

For Examples 1-4 and 9, the A and B Components were mixed in the proportion (by weight) of A:B=3:1 and at an index of 2.6. For Example 5, the A and B Components were mixed in the proportion (by weight) of A:B=2:1 and at an index of 1.7. For Example 6, the A and B Components were mixed in the proportion (by weight) of A:B=4:1 and at an index of 3.5. For Example 7 and 10, the A and B Components were mixed in the proportion (by weight) of A:B=3.3:1 and at an index of 2.7. For Example 8 and 11, the A and B Components were mixed in the proportion (by weight) of A:B=1:1 and at an index of 1.3. The mixture of each example was stirred in a polyethylene container to make the polyurea/polyurethane foam. The resulting foam composition was rapidly poured into polyethylene bag. The foaming reaction proceeded and the foam was allowed to free rise. The foams are cured for a minimum of 24 hours at room temperature before being tested. For each formulation about 1 kilogram (kg) foam was made via hand mix foam procedure for test.

For Examples 12, 100 g TPU and 40 g Benzoxazine were mixed at 150° C. in a Haake mixer for 5 minutes. Then, the melts were poured into a mold and the mold was kept in a cold (10~20° C.) press machine for 30 minutes. After curing, the mixture is removed from the mold for test.

For Example 13, 100 g TPU was melt at 150° C. and poured into a mold and the mold was kept in a cold (10~20° C.) press machine for 30 minutes. After curing, the TPU is removed from the mold for test.

Results
Flammability Resistance Performance and Physical Property

TABLE 2

| Example | 1 | 2 | 3 | 4 | 5 | 6 | 7 | 8 | 9 | 10 | 11 | 12 | 13 |
|---|---|---|---|---|---|---|---|---|---|---|---|---|---|
| Density [1] [kg/m³] | 44 | 49 | 49 | 48 | 48 | 49 | 52 | / | 48 | 50 | / | / | / |
| Compressive strength [2] [MPa] | 0.28 | 0.355 | 0.41 | 0.38 | 0.32 | 0.4 | 0.39 | / | 0.32 | 0.34 | / | / | / |
| Compressive modulus [3] [MPa] | 7.7 | 10.3 | 13 | 11 | 9.7 | 12.7 | 10 | / | 9.3 | 8.6 | / | / | / |
| Limited oxygen index [4] [%] | 24.2 | 25.6 | 25.9 | 25.7 | 25.1 | 26 | 23.5 | / | 21.7 | 21.6 | / | 25 | 22 |
| Tg [5] | 118 | 123 | 125 | 119 | 120 | 124 | 112 | 125 | 110 | 105 | 113 | / | / |

[1] Tested according to ASTM D792-00
[2] Tested according to ASTM D695-02
[3] Tested according to ASTM D695-02a
[4] Tested according to ASTM D2863: 1997
[5] Tested according to ASTM E1640 by Dynamic Mechanical Analyzers (DMA)

Table 2 shows the flammability resistance performance and physical property for Examples 1-13. When benzoxazine is present (Examples 1 to 8 and 12), there is a significant improvement of flammability resistance and no obvious influence on the mechanic properties of the foam. For Examples 1 to 8 the foam has higher glass transition temperature.

What is claimed is:

1. A composition comprising:
   (a) a polyfunctional isocyanate;
   (b) an isocyanate reactive composition comprising:
      (b1) a polyfunctional polyol and a catalyst composition; and/or
      (b2) a polyfunctional amine; and
   (c) a benzoxazine component, wherein the benzoxazine component is dissolved in at least one of components (a) and (b),
   wherein the molecular weight of the polyfunctional polyol is in an amount ranging from about 100 to about 800 Daltons and the portion of benzoxazine component (c) by weight percentage of the amount of component (b) and (c) is in the range from about 25 to about 60.

2. The composition of claim 1, wherein the composition has an NCO index in the range from about 0.7 to about 5.

3. The composition of claim 1, wherein the polyfunctional isocyanate is a polymeric MDI or an MDI isomer mixture or a mixture thereof.

4. The composition of claim 1, wherein the benzoxazine component is bisphenol-A type benzoxazine.

5. The composition of claim 1, wherein the polyfunctional polyol and the catalyst composition (b1) are present in the isocyanate reactive composition (b), and wherein the catalyst composition comprises an amine catalyst and/or a trimerization catalyst.

6. The composition of claim 1, wherein the polyfunctional amine (b2) is present in the isocyanate reactive composition (b), and wherein the polyfunctional amine (b2) is polyetheramine.

7. The composition of claim 1, wherein the composition further comprises at least one solvent.

8. The composition of claim 1, wherein the composition further comprises at least one surfactant.

9. A composition comprising:
   (a) a polyfunctional isocyanate, wherein the polyfunctional isocyanate is a polymeric MDI or an MDI isomer mixture or a mixture thereof;
   (b) an isocyanate reactive composition comprising:
      (b1) a polyfunctional polyol having a molecular weight in an amount ranging from about 100 to about 800 Daltons and a catalyst composition; and/or
      (b2) a polyfunctional amine;
   (c) a benzoxazine component dissolved in in at least one of components (a) and (b) in an amount from about 25 to about 60 weight percent based on a total weight of (b) and (c), wherein the benzoxazine component is a bis(dihydrobenzoxazine) based on a bisphenol.

10. The composition of claim 9, wherein the bisphenol is selected from the group consisting of: 4,4'-dihydroxybiphenyl, (4-hydroxyphenyl)$_2$C(O) (DHBP), bi(4-hydroxyphenyl)ether, bi(4-hydroxyphenyl)thioether, bisphenol A, bisphenol AP, bisphenol E, bisphenol H, bisphenol F, bisphenol S, bisphenol Z, phenolphthalein, and bi(4-hydroxyphenyl)tricyclo-[2,1,0]-decan.

11. The composition of claim 9, wherein the benzoxazine component is a monomer.

12. The composition of claim 9, wherein the benzoxazine component is an oligomer.

13. The composition of claim 9, wherein the isocyanate reactive composition is a polyfunctional amine, and the benzoxazine component is a polymer.

* * * * *